No. 876,441. PATENTED JAN. 14, 1908.
W. E. DATE.
MOTOR CONTROLLING DEVICE.
APPLICATION FILED MAR. 14, 1907.

Witnesses:
Robert H. Weir
J. C. Loomis

Inventor:
William E. Date
By Edwin B. H. Loomis Jr.
Atty.

No. 876,441. PATENTED JAN. 14, 1908.
W. E. DATE.
MOTOR CONTROLLING DEVICE.
APPLICATION FILED MAR. 14, 1907.

Witnesses:
Robert H. Weir
J. C. Lonnie

Inventor:
William E. Date
By: Edwin B. Hoover
Atty.

No. 876,441. PATENTED JAN. 14, 1908.
W. E. DATE.
MOTOR CONTROLLING DEVICE.
APPLICATION FILED MAR. 14, 1907.

No. 876,441. PATENTED JAN. 14, 1908.
W. E. DATE.
MOTOR CONTROLLING DEVICE.
APPLICATION FILED MAR. 14, 1907.

UNITED STATES PATENT OFFICE.

WILLIAM E. DATE, OF WESTFIELD, NEW JERSEY, ASSIGNOR TO THE CUTLER-HAMMER MANUFACTURING COMPANY, OF MILWAUKEE, WISCONSIN, A CORPORATION OF WISCONSIN.

MOTOR-CONTROLLING DEVICE.

No. 876,441.   Specification of Letters Patent.   Patented Jan. 14, 1908.

Application filed March 14, 1907. Serial No. 362,391.

*To all whom it may concern:*

Be it known that I, WILLIAM E. DATE, a citizen of the United States, residing at Westfield, in the county of Union and State of New Jersey, have invented new and useful Improvements in Motor-Controlling Devices, of which the following is a full, clear, concise, and exact description, reference being had to the accompanying drawing, forming a part of this specification.

My invention relates to improvements in devices for controlling electric motors, one of the objects of my invention being to provide a controller, which will automatically stop the motor at a predetermined point.

Another object of my invention is to provide a controller for automatically reversing the direction of operation of the motor at predetermined intervals.

In a certain class of machinery, and particularly washing machines, it is particularly desirable to have the machinery always stop at a given point, and it is one of the objects of my invention to provide a controller for an electric motor, by which a motor operating may be stopped at a predetermined point.

For the purpose of disclosing my invention, I have illustrated in the accompanying drawings one embodiment thereof.

In said drawings.

In the embodiment of my invention illustrated, a suitable casing 2 is provided, in the top and bottom of which are provided journals 3 and 4, which accommodate a vertically extending shaft 5. This shaft has keyed upon the outer end thereof a hand wheel 6, provided with openings 7 in two of the spokes thereof. The driving shaft 8, which may be a shaft extending from the mechanism operated from the motor has keyed thereon a cross arm 9, provided with projections 10, arranged to enter the openings 7 on the hand wheel to clutch the two shafts 5 and 8 together. The hand wheel or clutching member 6 is slidably mounted upon its shaft, whereby it may be moved into or out of engagement with the clutching member 9. The construction of the clutching member 6 in the form of a hand wheel also provides means whereby the shaft 5 may be manually rotated, if so desired.

The shaft 5 carries a semi-cylindrical drum 11, having mounted on the periphery thereof, and on projecting lugs 12, a plurality of contacts 13. The drum is mounted upon the shaft 5 in such a manner that the shaft may rotate independently thereof. This is accomplished by providing a pair of brackets 14ª, having collars 14 and 15 loosely mounted upon the shaft. The collar 14 is held in position between a pair of spacing collars 16 and 17 pinned to the shaft, and the collar 15 is held in position by the spacing collar 18 and journal 4. Each of the collars has formed integrally therewith a pair of radial arms 19 to which lugs 20, extending from the top and bottom of the drum 11, are secured by bolts 21. Insulating disks 22 are interposed between the lugs 20 and the arms 19 and between the bolts 21, the lugs and the arms, to properly insulate the drum from the remainder of the controller. The collars 14 and 15 also carry a pair of arms 23 and 24, forming at their outer ends, supporting brackets, in which is secured a vertically extending rod 25. The rod is preferably secured in position by means of pins 26, passed through the rod and through the arms 23 and 24. The rod is held in a central position by a coiled spring 27, mounted upon a drum 28, supported upon the shaft 4, and having its ends 29 and 30 engaging upon opposite sides of the rod 25. A stud 25ª secured to the top of the casing projects downwardly between the ends of the coiled spring to prevent it from rotating when the rod 25 is moved to either side of its central position, whereby when the arm is thus moved, the spring is placed under tension.

The portion of the shaft, intermediate with the ends of the drum, is screw threaded as at 31, and a threaded nut 32 is arranged to travel thereon. This nut is provided with a pair of arms 33, which engage upon either side of the rod 25, whereby when the nut is rotated, the arm will be moved from its central position, and at either end of the threaded portion, a split collar 36 is clamped upon the shaft 4, and each collar is provided with a dog 37, arranged to engage a dog 34, mounted on the nut 32, to rotate the nut. It will be seen that as the shaft 5 is rotated, the threaded nut will move up and down thereon, and at one limit of its travel, will be engaged by the dog 37 of one of the split rings, and when so engaged, it will be rotated, thereby moving arm 25 against the tension of the coiled spring 27, and at the same time moving the drum 11 past its center.

In order that the drum 11 may not be moved too far in either direction by the driving shaft 8, I provide a connecting and disconnecting mechanism for the clutch member 6, which comprises a yoke 38, having inwardly extending pins 39, operating in a channel 40 in the hub of the clutch member 6. This yoke is pivoted to the casing, and at its outer end is provided with a handle 41, whereby the same may be manually operated. Pivotally supported by the ends of the yoke is an arm 42, which is provided with a pin 43, operating in an opening in a projecting arm 44, extending from the top of the casing, and interposed between the arm 42 and the member 44 is a coiled spring 45. By this construction the ends of the yoke will be held raised or lowered. Extending downwardly from the yoke 38 is an arm 46, carrying a roller 47 arranged to be engaged by a cam 48 on the drum, in event the drum is moved too far in either direction. In operation if the drum is moved too far in either direction, the cam 48 will engage the roller 47, moving the arm 46 outwardly, thereby throwing the ends of the yoke 38 downwardly and disconnecting the two clutch members 6 and 9.

Mounted within the casing of the controller and secured to the back thereof by means of suitable bolts or screws 49 is a base 50 of insulating material. The contact fingers 51 of the controller are mounted on supports 52 secured to the base 50 and each support is provided with a binding post 53, whereby the proper electrical conductors may be electrically connected with the contact fingers 51.

The switches for controlling the direction of operation of the motor as well as the switch for controlling the circuit therethrough are mounted upon a suitable base 54, formed of soapstone or the like. Mounted upon this base 54, upon the upper portion thereof, are a pair of solenoids 55 and 56, secured upon the base by bolts, passed through lugs on the frame thereof. The core 57 of the solenoid 55 has secured thereto a tail rod 58 upon which are mounted a pair of switch members 59 and 60, arranged to bridge the contacts 61 and 62, and 63 and 64, respectively, also mounted upon the base 54. The core 65 of the solenoid 56 is also provided with a tail rod 66, which carries a pair of switch members 67 and 68 adapted to bridge the contacts 69 and 70, and 71 and 72, respectively. The cores 65 and 57 are connected by an interlocking rod 73 pivoted at 74 on the base 54, whereby both cores can not be raised at the same time. A third solenoid 75 is secured upon the base 54, and the core 76 thereof is provided with a tail rod 77, provided with a pair of disks 78 and 79, forming switch members, arranged to bridge the contacts 80 and 81, and 82 and 83 respectively. Suitable binding posts are also provided upon the base 54 whereby the various circuit connections of the solenoids and the contacts thereof are made.

Figure 1:
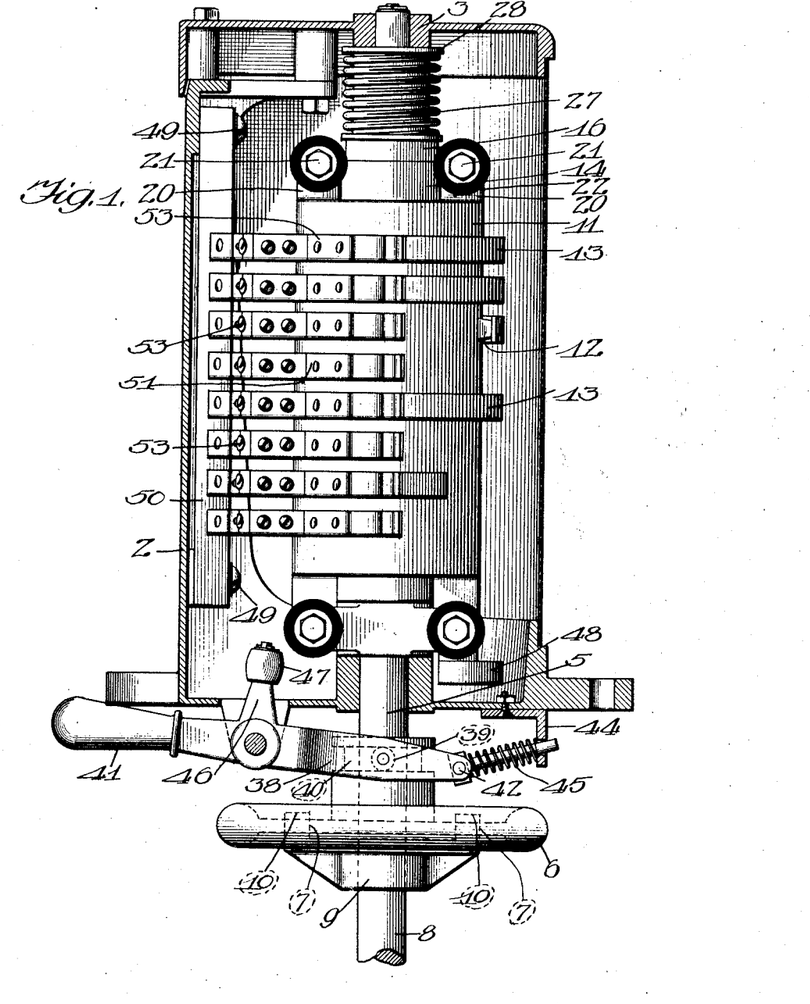
Figure 1 is a side elevation of my controller, the casing being in section.
Figure 2:
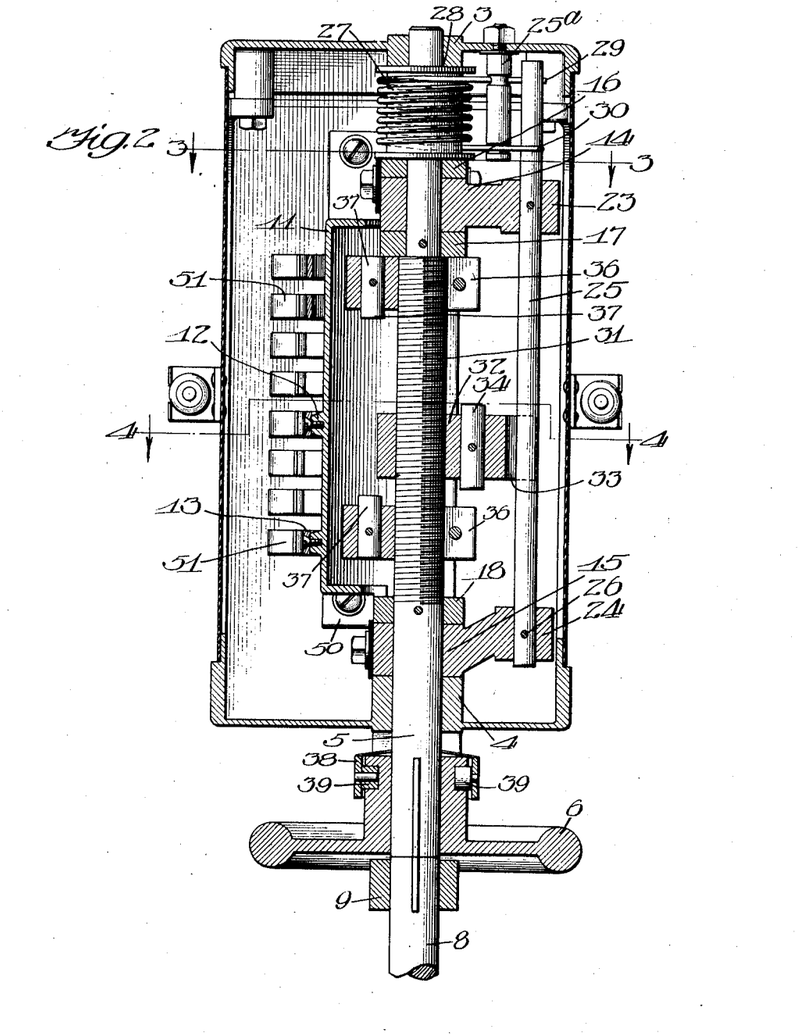
Fig. 2 is a sectional view taken on the line 2—2 of Fig. 3.
Figure 3:
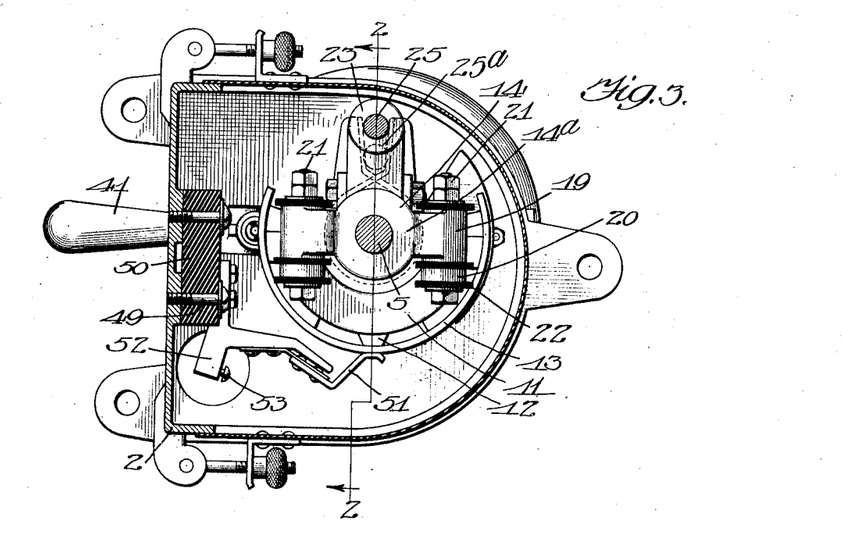
Fig. 3 is a sectional view taken on the line 3—3 of Fig. 2.
Figure 4:
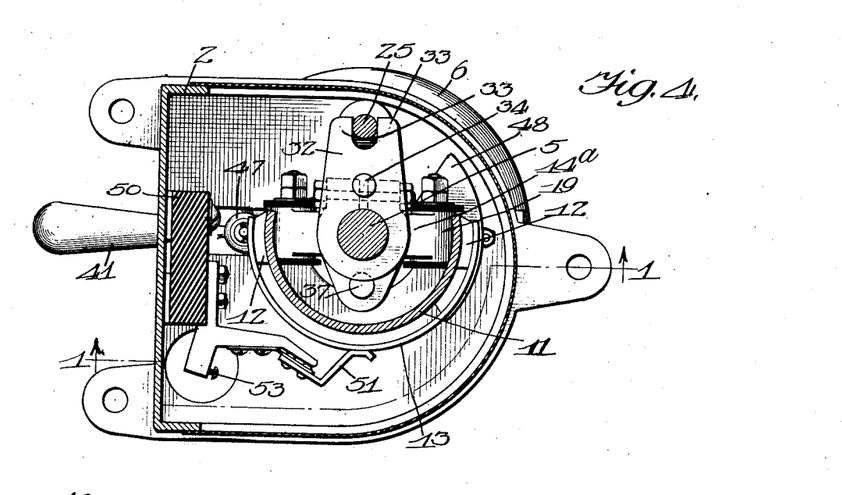
Fig. 4 is a sectional view taken on the line 4—4 of Fig. 2.
Figures 5, 6, 7, 8, 9:
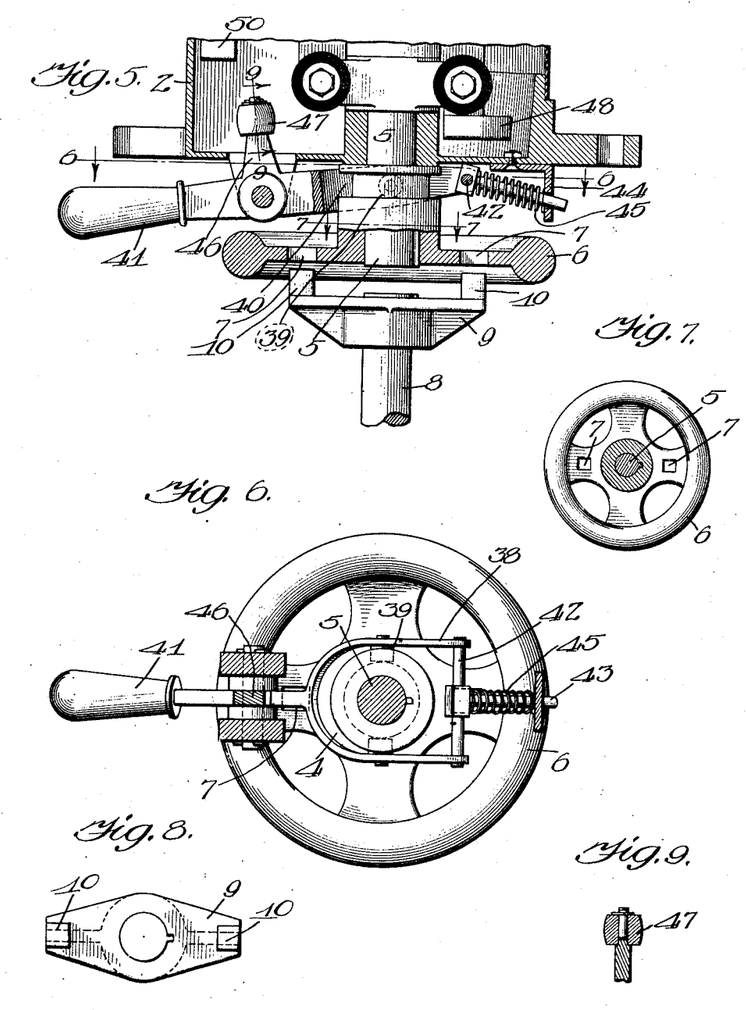
Fig. 5 is a detailed section of the clutch for connecting the controller with the operating means thereof.
Fig. 6 is a detailed plan of said clutch.
Fig. 7 is a plan view of one of the clutch members.
Fig. 8 is a plan view of the other clutch member.
Fig. 9 is a detailed section taken on the line 9—9 of Fig. 5.
Figure 10:
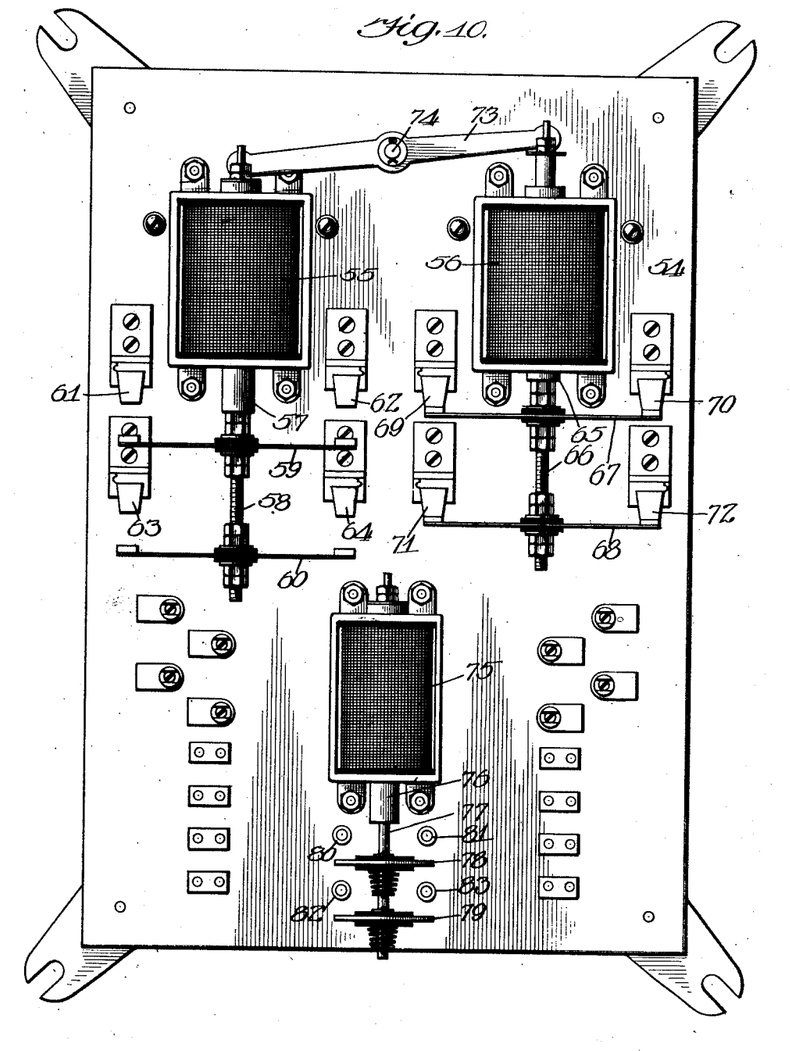
Fig. 10 is an elevation of the switch board of my invention.
Figure 11:
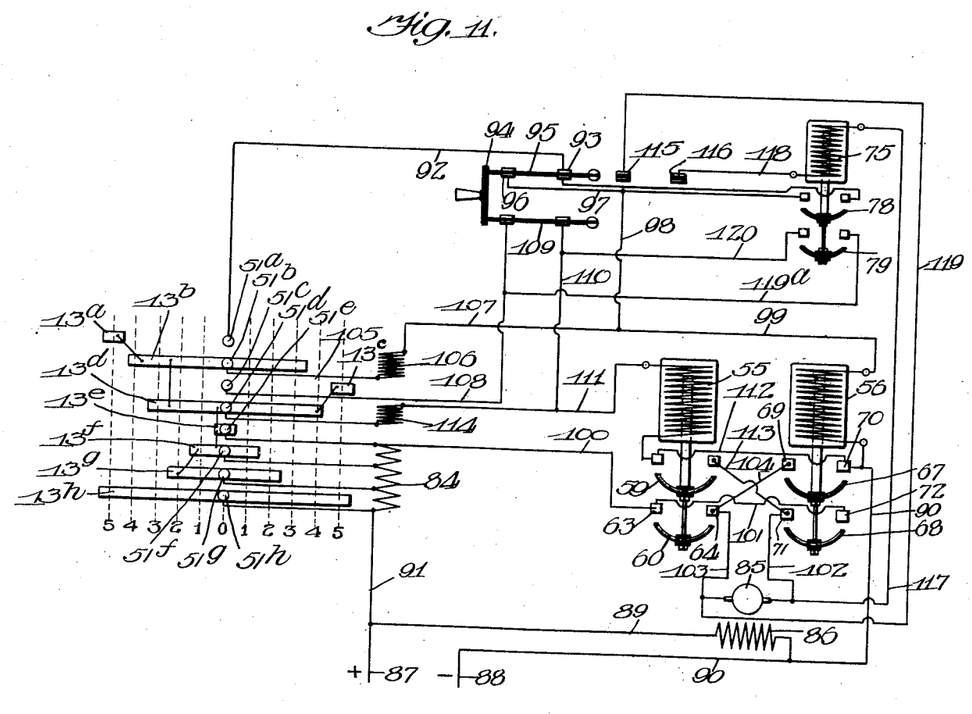
Fig. 11 is a diagrammatic view of the circuit arrangement of my invention showing the controller thereof developed.

An understanding of the operation of the controller will be better had by reference to Fig. 11. In this figure to properly distinguish the various contacts 13 of the drum, I have used exponents in addition to the numeral 13. I have also used in connection with the numeral 51, exponents for identifying the various contact fingers of the controller. The first four contacts of the controller control the circuit through the winding of the solenoids 55 and 56, while the last four contacts of the controller control a resistance 84, in circuit with the armature 85 of the motor. The shunt field 86 of the motor is permanently connected between the positive side 87 and negative side 88 of the line, by the conductors 89 and 90.

In operation, in starting the motor, the drum 7 is moved from its central position by the hand wheel 6, until the contact $13^a$ engages the contact finger $51^a$. This movement carries the drum 7 as far in one direction of its travel as it will go, and the nut 33 moves along the shaft 5, until the dog 32 is in engagement with one of the dogs 37. The closing of the contact $13^a$ with the contact $51^a$ closes the circuit from the positive side 87 of the line, through conductor 91, to contact finger $51^h$. The contact $13^h$ is of sufficient length, so that it will engage contact $51^h$ at the same time that the contact $13^a$ engages contact finger $51^a$, and circuit will therefore be closed from the contact $51^h$, through contact $13^h$, through the drum 7, to contact $13^a$, thence through contact $51^a$, by conductor 92, to contact 93 of the switch 94, across one arm 95 of said switch, to the contact 96; thence by conductors 97, 98, and 99, through the winding of the solenoid 56 and from there by conductor 90 to the negative side 88 of the line. This energizes the winding of the solenoid 56, causing it to attract its core and close the switches 67 and 68, thereby establishing a circuit from the positive side 87 of the line, by conductor 91, through all of the resistance 84, by conductor 100, to contact 63, thence by conductor 101, to contact 72, across the switch 68, to contact 71, thence by conductor 102, through the armature 85 of the motor by conductor 103, to contact 64, by conductor 104, to contact 69, across the switch 67 to contact 70, and thence by conductor 90, to the opposite main 88. This starts the motor and the shaft 5 is driven in a reverse direction permitting the nut 32, and with it the drum 11, to slowly move back to its normal position, under the influence of the spring 27. As the drum slowly moves back to its central position, the contact 13$^b$ will engage the contact finger 51$^b$, and the contact 13$^a$ will pass off the contact finger 51$^a$. A new circuit will therefore be established for the winding of the solenoid 56 from the positive side 87, by conductor 91, to contact finger 51$^h$ and contact 13$^h$, through the drum to contact 13$^b$, thence by contact finger 51$^b$, by conductor 105, through the resistance 106, and by conductors 107 and 99, to the winding 56. The insertion of the resistance 106 in series, with the winding of the solenoid 56, cuts down the strength of the solenoid 56, to such an extent that while it will maintain the contacts 67 and 68 closed, it will not raise its core to close the contacts in event the core drops. A continued movement of the drum 7 will cause the contacts 13$^e$, 13$^f$ and 13$^g$ to respectively engage the contact fingers 51$^e$, 51$^f$ and 51$^g$, thereby cutting out the resistance 84, section by section, from the motor circuit. The motor will now be operating at full speed, and will continue to so operate, until the traveling nut 32 reaches the opposite limit of its travel, when the dog 34 will be engaged by the opposite dog 32, and the nut will be rotated, carrying with it the rod 25, and moving the drum past its center in its opposite direction. When the drum reaches the limit of its movement in the opposite direction, the contact 13$^c$ will engage the contact finger 51$^c$, closing a circuit through the winding of the solenoid 55, from the conductor 91, to the contact finger 51$^h$, thence to the contact 13$^h$, through the drum to contact 13$^c$, thence to contact finger 51$^c$, by conductor 108, across the arm 109 of the knife switch, by conductors 110, 111, through the winding of the solenoid 55, thence by conductor 112, and conductor 90, to the negative side 88 of the line. Just prior to the time that the contact 13$^c$ engages contact finger 51$^c$, the contact 13$^b$ passes off contact finger 51$^b$, thereby opening the circuit of the solenoid 56. The closing of the solenoid 55 causes the same to attract its core and close the switches 59 and 60. This closes a reverse circuit through the armature of the motor, from the conductor 91, through the resistance 84, by conductor 100, across the switch 60, by conductor 103, through the armature 85, by conductors 102 and 113, across the switch 59, and thence by conductors 112 and 90, to the negative side 88 of the line. The motor will thus start in a reverse direction, reversing the direction of operation of the shaft 4 and permitting the drum 11 to slowly move back to its central position under the influence of the spring 27. As the contact 13$^c$ moves off the contact finger 51$^c$, the contact 13$^d$ will engage the contact finger 51$^d$, inserting the resistance 114 in series with the winding of the solenoid 55, thereby cutting down the strength of said solenoid to such a degree that while it will maintain the switches 59 and 60 in a closed position, it will not close said switches in event they open. The controller will thus continue to periodically reverse the direction of operation of the motor as long as the switch 94 is closed.

Supposing that as soon as the contact 13$^c$ engages the contact finger 51$^c$, the knife switch 94 is opened until the blade 95 thereof bridges the contacts 115 and 116. A circuit is immediately established from one terminal of the armature by conductor 117, through the winding of the solenoid 75, thence by conductor 118, across the switch blade 95 and by conductor 119, to the opposite terminal of the armature. This energizes the winding of the solenoid 75 and the switches 78 and 79 are closed. Therefore, while the circuit through the solenoid 55 is opened at the switch 94, it is closed from conductor 108, by conductor 119$^a$ across the switch 79, and thence by conductor 120 to the conductor 110. The motor will continue to operate under these conditions, until the drum has been moved to a position where the contact 13$^a$ engages the contact finger 51$^a$, and the contact 13$^d$ passes off the finger 51$^d$. When the contact 13$^d$ passes off the finger 51$^d$, the circuit through the solenoid 55 is opened, which opens the switches 59 and 60, and when the contact 13$^a$ engages contact finger 51$^a$, it establishes a circuit through the winding 56, which closes the switches 68 and 67, permitting current to flow through the armature in a direction opposite to that which it has previously been taking, and thereby effectively plugging the motor and causing the same to come to rest. As soon as the motor comes to a stop the magnet 75 is deënergized, permitting the switches 78 and 79 to drop and open the motor circuit.

Having thus described my invention what I claim as new and desire to secure by Letters Patent is:

1. The combination with a motor, of continuously operated means for periodically changing the direction of operation of the motor, and means for stopping the same at a predetermined point.

2. The combination with a motor, of a continuously operated controller therefor, having a movable member, the direction of movement of which is periodically changed to periodically change the direction of operation of the motor, and means for stopping the motor at a predetermined point.

3. The combination with a motor, of a plurality of switches for controlling the direction of operation of the motor, continuously operated means for causing said switches to operate alternately, and means for stopping said motor at a predetermined point.

4. The combination with a motor, of a plurality of switches for controlling the direction of operation of the motor, of means for causing said switches to operate alternately, and a switch for controlling the circuit through said motor controlling switches, arranged to remain closed upon the stopping of the motor, until said switch controlling means reaches a predetermined condition.

5. The combination with a motor, of a plurality of switches for controlling the direction of operation of the same, a movable member for causing said switches to operate alternately and adapted to insert and gradually cut out a resistance in the motor circuit upon change of direction of operation thereof, and means for stopping said motor at a predetermined point.

6. The combination with a motor, of a plurality of switches for controlling the direction of operation thereof, a plurality of electro-responsive devices for operating said switches, a movable member for alternately closing the circuit through said electro-responsive devices, a switch for controlling the circuit through said electro-responsive devices, and an electro-responsive device for operating said switch, the circuit of which is closed when the main switch is opened.

7. The combination with a motor, of a plurality of switches for controlling the direction of operation of the same, a plurality of electro-responsive devices for operating said switches, a controller adapted when moved in one direction, to close an operative circuit through one of said electro-responsive devices, and when moved in an opposite direction to close an operative circuit, through the other of said electro-responsive devices and means for stopping the motor at a predetermined point.

8. The combination with a motor, of a plurality of switches for controlling the direction of operation thereof, a plurality of electro-responsive devices for operating said switches, a movable member for alternately closing an operative circuit through said electro-responsive devices, a main switch controlling the circuit through said electro-responsive devices, and an auxiliary switch for controlling a shunt around said main switch.

9. The combination with a motor, of a controller for periodically changing the direction of operation thereof, driven from the mechanism operated by the motor, and means for automatically disconnecting said controller from its driving mechanism, under predetermined conditions.

10. The combination with a motor, of a continuously operating controller for periodically changing the direction of operation of the motor, means for operating said controller, and means for automatically disconnecting the same from its operation under predetermined conditions.

11. The combination with a motor of means thrown into operative relation, at will, by the operation of a suitable instrumentality for automatically stopping the motor when the same operates to a predetermined limit.

12. The combination with a motor of electro-magnetically operated reversing switches therefor, and a relay device thrown into operation when a suitable instrumentality is operated for maintaining the circuit through the magnet of said switch, until the motor operates to a predetermined limit.

13. The combination with a motor, of electro-magnetically operated reversing switches therefor, a controller for controlling the operation thereof, and a relay thrown into operation when a suitable instrumentality is operated for maintaining the circuit relations of the magnets of said reversing switches, until the motor operates to a predetermined limit.

14. The combination with a motor of electro-magnetically operating switches for controlling the direction of operation thereof, means for automatically energizing the magnets of said switches, a relay switch closed upon the operation of a suitable instrumentality, and adapted to maintain the circuit relations of the magnets of the reversing switches, until the motor has operated to a predetermined limit.

15. The combination with a motor, of a plurality of electro-magnetically operated reversing switches for controlling the direction of operation thereof, a continuously operated controller for controlling alternately energizing magnets of said switches, a relay switch closed upon the operation of a suitable instrumentality to maintain the circuit relation of the magnets of the reversing switches, until the motor has operated to a predetermined limit.

16. The combination with a motor, of a plurality of electro-magnetically reversing switches for controlling the direction of operation thereof, a hand switch for controlling the circuit relation of the magnet of said switches, means for alternately energizing the magnets of said switches, and a relay switch closed upon the opening of said hand switch to maintain the circuit relation of the magnets of the reversing switches, until the motor has operated to a predetermined limit.

17. The combination with a motor, of a plurality of electro-magnetically operating reversing switches therefor, a drum controller actuated by the motor to periodically operate said reversing switches to reverse the direction of operation of the motor, and a relay device placed in operation when the operator actuates a suitable instrumentality to maintain the circuit relation of the magnets of said reversing switches, until the motor has operated to a predetermined limit.

18. The combination with a motor, of electro-magnetically operated reversing switches therefor, a drum controller operating alternately in opposite directions for controlling the operation of said reversing switches, and a relay closed upon the actuation of a suitable instrumentality for maintaining the circuit relation of the magnets of said reversing switches, until the motor has operated to a predetermined limit.

19. The combination with a motor, of electro-magnetically operated reversing switches for controlling the direction of operation thereof, a drum controller for controlling the operation of said switches comprising a shaft driven from the motor, a drum loosely mounted thereon, a traveling member on said shaft connected with said drum and means at each limit of travel of said member for connecting the same with the shaft to cause the drum to rotate with the shaft, and a relay operated upon the actuation of a suitable instrumentality for maintaining the circuit relation of the magnets of the reversing switches, until the motor has operated to a predetermined limit.

20. The combination with a motor of electro-magnetically operated reversing switches, a drum controller having mechanical means whereby it may be operated directly or indirectly from the motor, and adapted to control the operation of the reversing switches to periodically change the direction of operation of the motor, an electro-magnetically operated relay switch, a manually actuating switch by which the magnet of the relay switch is connected across the armature terminals, said relay switch being arranged to maintain the circuit relation of the reversing switches, until the motor has operated to a predetermined limit.

In witness whereof I have hereunto subscribed my name in the presence of two witnesses.

WILLIAM E. DATE.

Witnesses:
W. PERRY HAHN,
J. C. LOOMIS.